(12) United States Patent
Tangonan et al.

(10) Patent No.: US 6,819,849 B1
(45) Date of Patent: Nov. 16, 2004

(54) INTRUSION DETECTION SYSTEM FOR SECURE FIBER OPTICS

(75) Inventors: Gregory L. Tangonan, Oxnard, CA (US); Melvin E. Pedinoff, Thousand Oaks, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 1826 days.

(21) Appl. No.: 07/228,793

(22) Filed: Jul. 29, 1988

Related U.S. Application Data (63) Continuation-in-part of application No. 06/791,494, filed on Oct. 25, 1985, now abandoned.

(51) Int. Cl.[7] ................................................. G02B 5/14
(52) U.S. Cl. .......................... 385/126; 385/12; 385/31; 385/142; 398/142
(58) Field of Search ............................ 350/96.06, 96.1, 350/96.23, 96.33, 96.31, 30; 356/237; 455/610, 612; 332/7.51; 385/12, 31, 124, 126, 127, 142; 398/142, 143

(56) References Cited

U.S. PATENT DOCUMENTS

| | | | |
|---|---|---|---|
| 3,657,544 A | | 4/1972 | Scholdstrom |
| 3,981,592 A | | 9/1976 | Williams |
| 4,062,618 A | | 12/1977 | Steensma |
| 4,070,091 A | * | 1/1978 | Taylor et al. ............ 350/96.31 |
| 4,134,642 A | * | 1/1979 | Kapron et al. ........... 350/96.33 |
| 4,144,530 A | | 3/1979 | Redfern |
| 4,174,149 A | | 11/1979 | Rupp |
| 4,207,561 A | | 6/1980 | Steensma |
| 4,211,468 A | | 7/1980 | Steensma |
| 4,211,920 A | | 7/1980 | Wakabayashi |
| 4,237,550 A | | 12/1980 | Steensma |
| 4,246,475 A | | 1/1981 | Altman |
| 4,257,033 A | | 3/1981 | Ota et al. |
| 4,294,513 A | * | 10/1981 | Nelson et al. ............ 455/612 |
| 4,436,368 A | * | 3/1984 | Keck ....................... 350/96.33 |
| 4,770,485 A | * | 9/1988 | Buckley et al. .......... 350/96.18 |

FOREIGN PATENT DOCUMENTS

| | | | | |
|---|---|---|---|---|
| CA | 1047810 | * | 2/1979 | ............. 350/96.33 |
| GB | 2061547 | * | 5/1981 | ............. 350/96.33 |

OTHER PUBLICATIONS

Howard, A. Q.; Microbend losses . . . Optical Fibers; 11/77, pp 1–54, NTIS, PB –275 387/9 : abst supplied.*

Sumak et a;: "Differential Model Delog . . . Waveguides"; Dec. 3, 1981, PPG 1.6/1–5, NTC'81, (RCB) vol. 4; abst. supplied.*

Barnoski et al; "Measurements in Fiber Optics"; 4/78; Proc. IEEE, vol. 66, #4, pp429–441.*

* cited by examiner

*Primary Examiner*—Nelson Moskowitz
(74) *Attorney, Agent, or Firm*—V. D. Duraiswamy; M. W. Sales (57) ABSTRACT

Methods and apparatus are disclosed for an intrusion detection system for secure fiber optic communication systems. A guard signal is transmitted over the optical fiber communication link and both the modal power and modal phase delay of this signal are monitored. Intrusions into the link for the purpose of intercepting information being transmitted, cause changes in the modal phase delay and power of the guard signal. These changes, when detected by the monitoring system, indicate the presence of an intruder. A fiber profile which is optimal for both transmission and intrusion detection purposes is described.

17 Claims, 9 Drawing Sheets

INTRUSION DETECTION SYSTEM FOR SECURE FIBER OPTICS

This application is a continuation-in-part of application Ser. No. 06/791,494, filed Oct. 25, 1985, now abandoned.

BACKGROUND OF THE INVENTION

1. Field of the Invention

This invention relates generally to optical fibers both graded index multi-mode and single-mode, and particularly to a method of monitoring both the modal phase delay and power of a microwave signal which is transmitted by the fiber as optical radiation. This method of monitoring enables effective detection of intrusions into secure fiber optic communication links.

2. Description of Related Art

The development of graded index fibers was an important advance in optical fiber technology. In a graded index fiber, the refractive index varies from a maximum axial value, radially throughout the core, but is usually constant in the cladding region. The index distribution, that is, variation of the refractive index n as a function of the radius, of a graded index fiber may be written as:

$$n(r) = \begin{cases} n_1[1 - 2(r/a)^g \Delta]^{1/2} & \text{for } r < a \\ n_o & \text{for } r > a \end{cases} \text{ where,}$$

$a$ = core radius;
$r$ = radical coordinate
$n_1$ = refractive index on the axis;
$n_o$ = refractive index of the cladding;
$\Delta$ = a constant which is given by the relative-index difference, namely,
$$\frac{n_1^2 - n_o^2}{2n_1^2} \approx \frac{n_1 - n_o}{n_1}; \text{ and}$$
$g$ = exponent of the power law.

(See *Optical Fiber Telecommunications,* Eds. Stewart E. Miller and Alan G. Chynoweth, Academic Press, 1979, Ch. 3 "Guiding Properties of Fibers", pp. 38). In the special case when g=2, the fiber is said to be a "parabolic-index" or "squarelaw" or "optimum power law" fiber.

As mentioned earlier, the core of a graded index fiber has an index of refraction that varies radially from the axis outward to the periphery. Ideally, this gradual variation in refractive index should be such that it exactly compensates for the variation in path lengths of the different modes of propagation of optical energy along the fiber, so that all the modes travel along the fiber at the same axial velocity. In actuality, although such perfect compensation cannot be achieved, modal dispersion can be greatly minimized.

Fiber characterization by accurate measurement of important parameters such as attenuation, bandwidth, modal delay distortion, pulse dispersion, refractive-index profile and mechanical strength of the fiber provides the data necessary both for systems design and for development of better fibers. The increasing use of fiber optic communication links has been accompanied by the effort to develop higher bandwidth fibers, and many techniques have been developed for convenient and accurate measurement of the bandwidth and other parameters of fibers needed to provide the data necessary for this development effort.

The bandwidth of transmitting fibers is limited by dispersion, whereby a narrow or rectangular pulse of optical energy is spread out or smeared in time as it travels along the fiber. The effect of such pulse dispersion is to limit the potential bandwidth of the transmitting fiber. This dispersion, referred to sometimes as 'delay distortion', can be measured by one of several techniques, either in the time domain (impulse-response measurements) or in the frequency domain (transfer-function measurements). See the article by Michael K. Barnoski and S. D. Personick "Measurements in Fiber Optics" in Proceedings of the IEEE, vol. 66, no. 4, pp. 436–8, April 1978, for a review of the above-mentioned techniques and a brief discussion of the causes and effects of delay distortion. Briefly, the time-domain, impulse-response measurement approach involves injecting a narrow pulse of light into one end of a fiber, detecting the broadened output pulse at the other end, and determining the time delay for different modes. The frequency domain phase delay measurement technique uses frequency modulation of the input optical beam.

The ultimate goal of the fiber characterization techniques briefly discussed above is generally only the selection of a fiber which minimizes phase and time delay distortion during transmission. However, an important and additional goal of systems for detecting intrusions into secure communication links is the selection of a fiber which both minimizes delay distortion and has maximum sensitivity to intrusions.

Conventional secure optical communication systems use masking signals and alarm arrangements to make the data-carrying signal secure. A masking signal is launched, at an input angle different from that of the data-carrying signal, into the communication line. This prevents intruders from separating the data-carrying signal from the masking signal when they observe the line radially. Limitations of such arrangements include low bandwidth of the order of 10 to 20 Mb/sec, and applicability only to point-to-point communications.

It is well-known that when a transmitting fiber is perturbed by an intruder, changes in the transmitted power occur. Therefore, intrusion detection systems have been implemented wherein power monitoring of a guard signal is used. Attempted access to the inner information-carrying core causes a decrease in intensity of a security signal being transmitted in an outer concentric core, alerting the operator to the attempted intrusion. However, a major drawback of such systems is the difficulty of maintaining power stability, that is, the difficulty of avoiding fluctuations in the output power caused not by intruders but by the optical components themselves.

Consequently, there is a need for an intrusion detection system which can be used in point-to-point and network applications, which works with graded- and single-mode fibers achieving high bandwidth, and has a high degree of accuracy and sensitivity.

SUMMARY OF THE INVENTION

An optical fiber for secure transmission of an optical beam therethrough and for enhanced sensitivity to intrusion, is described. The fiber comprises:

a cladding, and a primary core having a cross-sectional profile, said index profile having at least first, second and third regions having a graded index, a first step index region interposed between said first and second regions, and a second step index region interposed between said second and third regions, said index profile being uniform along the length of said fiber, said index profile for enhancing modal phase delay variation in said beam responsively to said intrusion.

It is an object of the present invention to provide a fiber optic system for detecting and signalling intrusions into fiber optic communication links.

It is another object of this invention to provide a system for and a method of simultaneously making modal phase delay and power measurements whereby intrusions into secure fiber optic communication links can be detected.

It is a further object of this invention to provide a system for testing optical fibers for suitability for use in intrusion detection systems.

Other objects and advantages of this invention will be apparent from the following description, the accompanying drawings and the appended claims.

BRIEF DESCRIPTION OF THE DRAWINGS

FIG. 9b depicts a modal delay curve for the profile of FIG. 9a.

DETAILED DESCRIPTION OF THE PREFERRED EMBODIMENT

Typically the measurement techniques in current use, discussed briefly earlier, concentrate on fiber characterization for the purpose of selecting optimal fibers which achieve a minimum of pulse dispersion, transmission losses, and modal phase delays. However, for purposes of using in a system which detects and reacts to "intrusions" into secure fiber optic communication links, a different system and approach are needed, and these are provided by the present invention.

The optimal fiber for intrusion detection should exhibit substantial and noticeable modal phase delay and power changes even if the fiber is perturbed very slightly. Therefore, if effective intrusion detection, in addition to efficient transmission is desired, communication links should employ fibers exhibiting not only uniformly low modal phase delays and power changes as is typically the current practice, but also additionally exhibiting adequate fluctuations in the modal phase delay and power attenuation parameters for even small perturbations, thereby permitting detection of even minor intrusions.

These aspects of the invention will now be discussed in detail with reference to the accompanying drawings, in which like referenced characters refer to like parts. It is well known that time and phase delays are readily interconvertible. Therefore, references to modal delay in this description are to be understood as references to both time and phase delays, and references to modal delay profiles are applicable to modal phase delay (MPD) and modal time delay (MTD) profiles.

Figure 1:
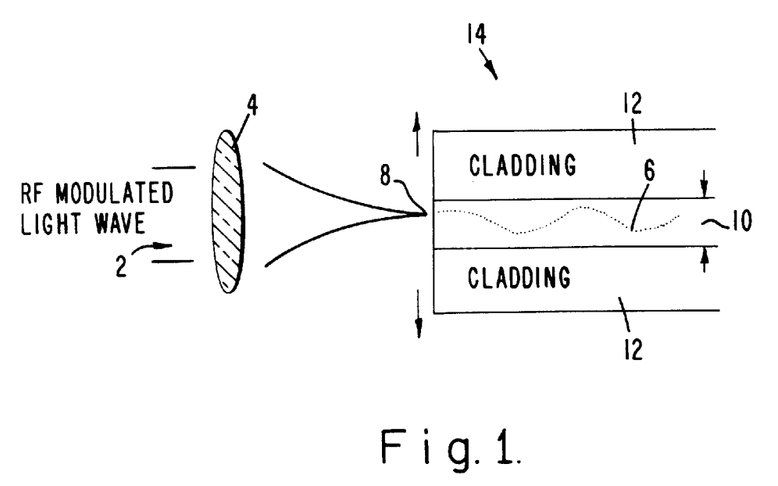
FIG. 1 is a diagram showing the modal launch of a light wave into the core of a fiber.

FIG. 1 shows typical modal launching using lens 4 of a RF modulated light wave 2 into the core 10 of a fiber 14 with cladding 12. For a multi-mode fiber, different modes of propagation can be selectively excited by changing the launch conditions. In FIG. 1, the dotted line 6 actually represents groups of modes being propagated along the fiber core 10. By varying entry point 8, that is, the point at which the light wave 2 is launched into core 10, different modes can be excited within the fiber. The radial distance of entry point 8 from the core axis is the radial coordinate, r, referred to earlier in the index distribution equation. The arrangement shown in FIG. 1 and frequency domain techniques for phase delay monitoring using frequency modulation of the input light wave to obtain amplitude frequency response and phase-frequency response data are well-known in the art.

In accordance with the present invention, a guard signal is transmitted over the optical fiber communication link and in the preferred mode, both the modal power and modal phase delay (MPD) of this signal are monitored. Intrusions into the link for the purpose of intercepting information being transmitted perturb the fiber and casue changes in the modal phase delay and power of the guard signal. Detected changes in the modal phase delay and power of the guard signal indicate the presence of an intruder.

By monitoring the power transmitted by the fiber, as is conventionally done, in combination with the MPD measurements as is disclosed herein, the new combination intrusion detection technique of the present invention permits detection of all of the following four different effects caused by intrusions:

1. loss of guided mode power to cladding modes or leaky modes;
2. mode-mixing or exchange of optical power between the different modes;
3. fiber bandwidth changes; and
4. modal delay changes.

Additionally, as further discussed below, modal phase delay measurements are particularly sensitive to even small perturbations. Consequently, the present invention provides a high degree of accuracy and sensitivity in detecting perturbations.

Figure 2:
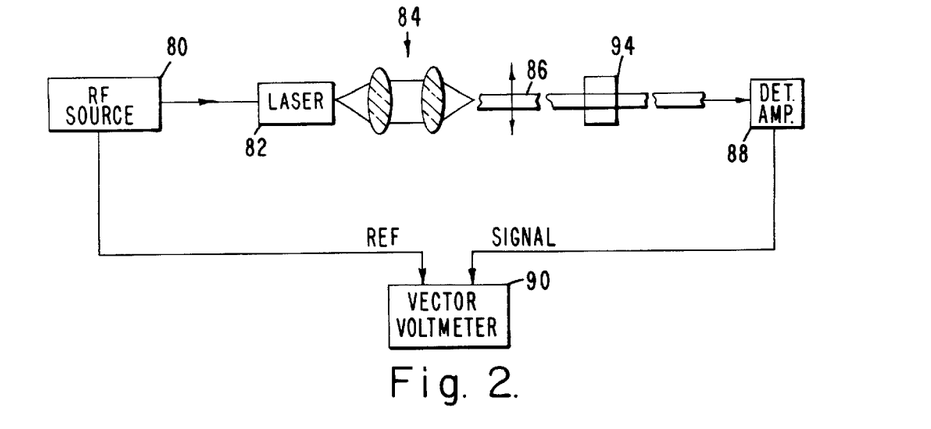
FIG. 2 is a circuit diagram of the intrusion detection system of the present invention.

Although this combination intrusion detection technique can be implemented using any suitable configuration and combination of known measuring devices, two specific arrangements are described by way of example below. Referring now to FIG. 2, a schematic circuit diagram for making the dual measurements is shown. A microwave guard signal from RF source 80 is imposed on laser 82, and the modulated laser output is focused using a suitable lens system 84 onto the end of a fiber 86. Different modes of propagation can be selectively excited by suitably scanning the end of fiber 86 through the focused laser 82 output using conventional arrangements. The output from fiber 86 enters a detector/amplifier 88 and then proceeds to a vector voltmeter 90. A reference signal REF from RF source 80 proceeds directly to the vector voltmeter, 90. Vector voltmeter 90 makes both the input-to-output phase delay measurements and the measurement of the optical power detected by detector 88. Suitable means 94 of perturbing fiber 86 at any point within it are also provided when the circuit is used for testing fibers.

Figure 3:
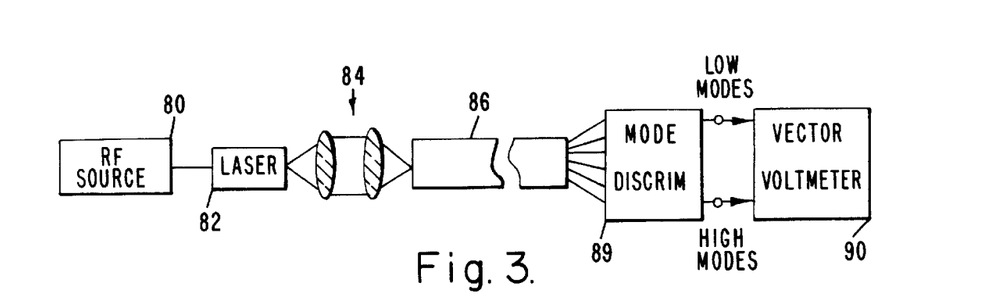
FIG. 3 is an alternate circuit diagram of the intrusion detection system of the present invention.
Figure 4:
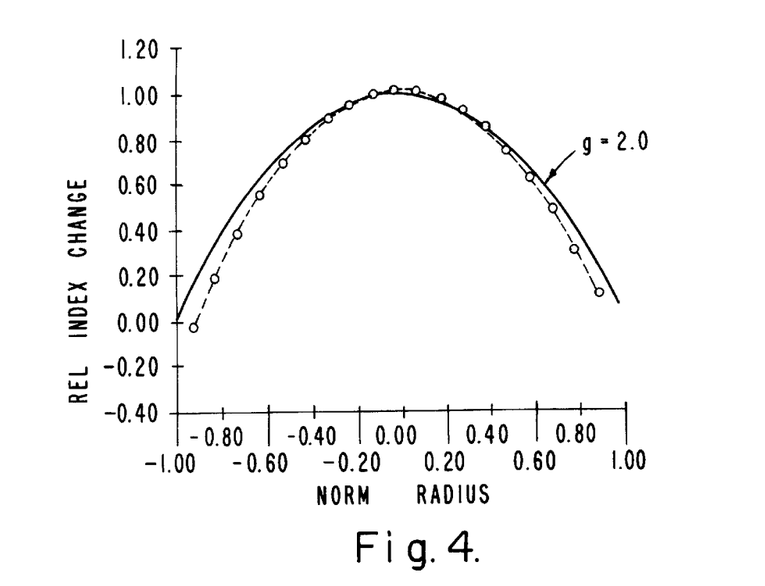
FIG. 4 shows the index profile for a particular commercially-available fiber.

Referring now to FIG. 3, the arrangement is essentially the same as that disclosed in FIG. 2, but additionally, a mode discriminator 89 is interposed between the output end of fiber 86 and vector voltmeter 90. The power monitoring components including detector/amplifier 88 are not shown in FIG. 3 for the sake of simplification. The circuit can be used for intrusion detection as shown in FIG. 3 or in conjunction with the power monitoring components, depending on whether only phase delay monitoring is desired or whether combination phase delay and power monitoring is desired. The preferred systems approach is to monitor both the modal phase delay and the power. The mode discriminator 89 separates the low order and high order modes, and inputs them as two distinct inputs to the vector voltmeter 90. Therefore, the relative phase difference between the high order and low order modes is measured directly by voltmeter 90. In the circuit diagram of FIG. 2, there is no mode discrimination and it is the phase difference between the transmitted guard signal and a reference signal REF that is measured by voltmeter 90. The circuit of FIG. 3 is preferred since it alleviates frequency stability problems caused by the separate reference transmission.

It is to be understood that whereas the principles of the present invention are discussed below with reference to a specific commercially available fiber, this description is made only by way of example and not limitation.

A commercially available graded index fiber manufactured by Corning (Corning 3135) with a fiber loss of 0.85 at 3.5 dB/km was used as test fiber 86. This test fiber 86 had a core diameter of 6.5 microns, cladding diameter of 125 microns and length 480 meters. The index profile was determined using the circuit shown in FIG. 2 and the well-known near-field method. A signal frequency of 400 MHz was used. No leaky mode correction was applied to data obtained. The measured profile at a wavelength of 0.78 $\mu$m is depicted by the dashed line in FIG. 5; the solid line represents the parabolic-index profile. The best fit of the measured profile corresponds to g=1·8. The experimental results obtained when test fiber 86 was subjected to different perturbations are presented as graphs in FIGS. 5–7. Perturbations were introduced close to the input in order to maximize modal delays observed at the other end of the fiber.

Figure 5A:
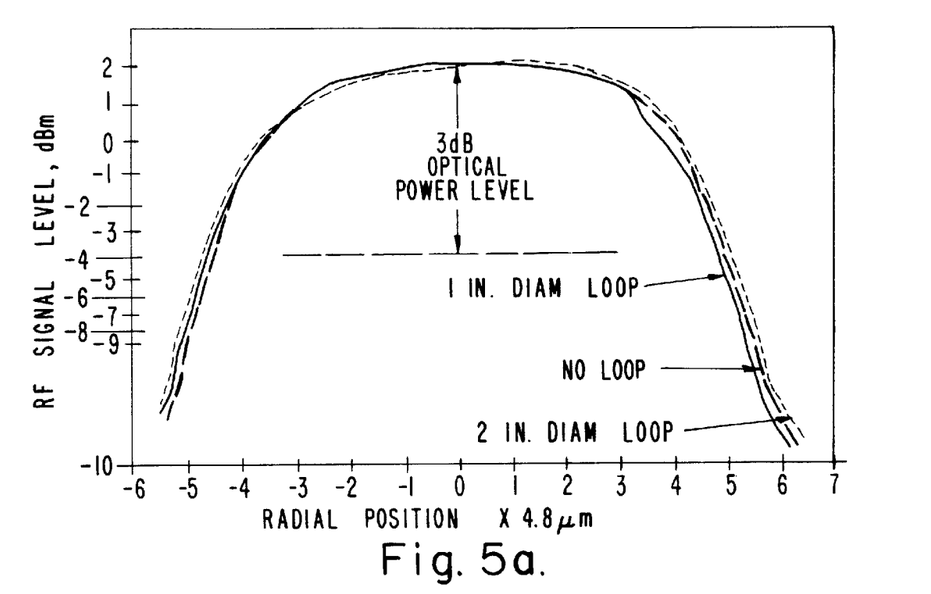
FIGS. 5a and 5b show modal attenuation and modal delay profiles, respectively, for the same fiber when subjected to small loop perturbations.
Figure 5B:
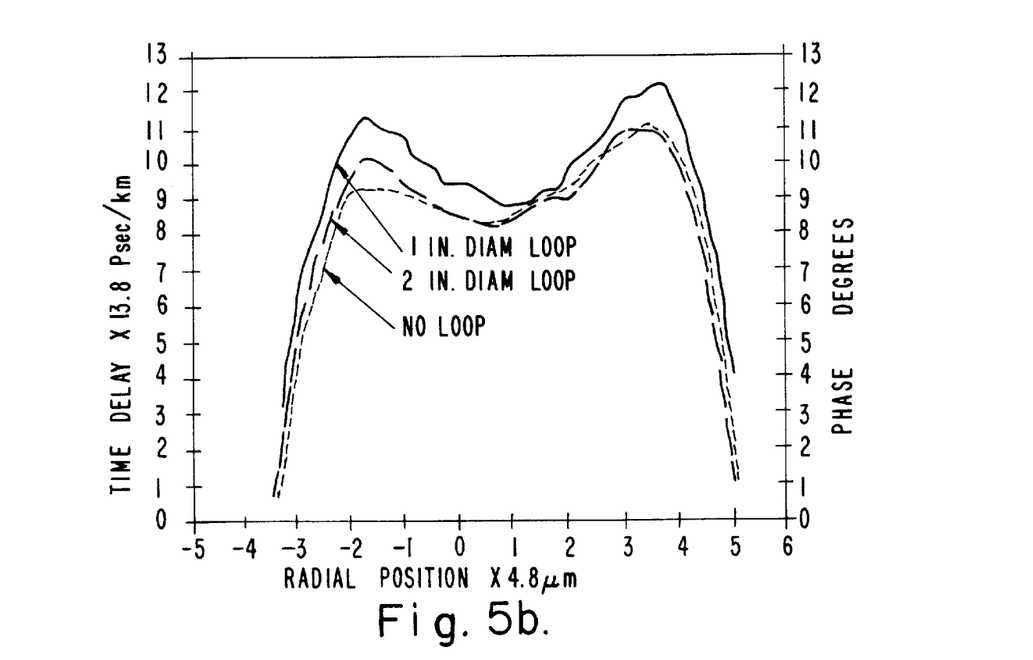

FIGS. 5a and 5b show modal attenuation and delay profiles, respectively, of test fiber 86 when it was subjected to small loop perturbations. Three modal attenuation profiles corresponding to no loop, 1 inch diameter loop and 2 inch diameter loop are shown in FIG. 5a. Notice that the profiles vary very slightly. Three modal delay profiles corresponding to no loop, 1 inch diameter loop and 2 inch diameter loop are shown in FIG. 5b. Notice that these modal delay profiles vary noticeably over much of the range of modes studied. By comparing the profiles shown in FIG. 5a with those in FIG. 5b it can be seen that for the same small loop perturbation, the modal delay changes are more sensitive to perturbation than modal attenuation changes.

Figure 6A:
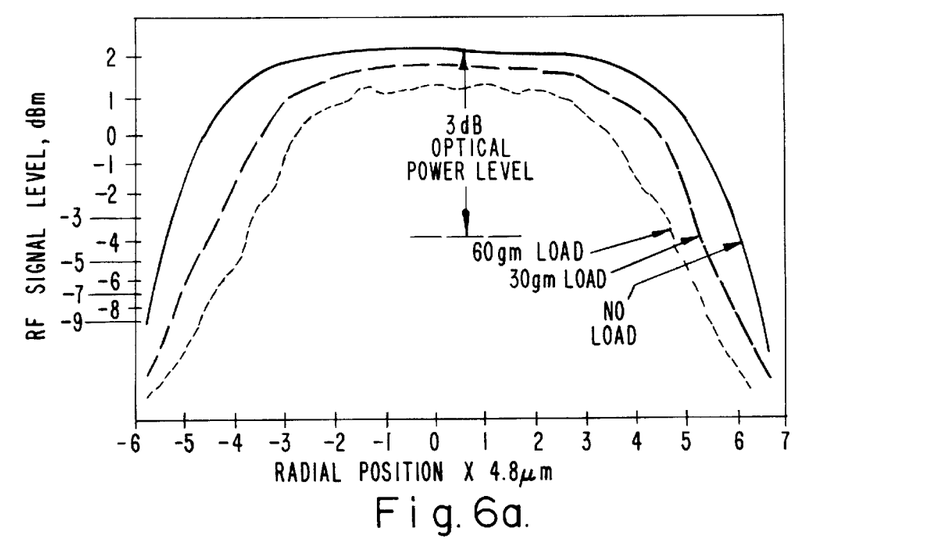
FIGS. 6a and 6c show modal attenuation and FIGS. 6b and 6d show modal delay profiles, for the same fiber when subjected to periodic macrobend perturbations.
Figure 6B:
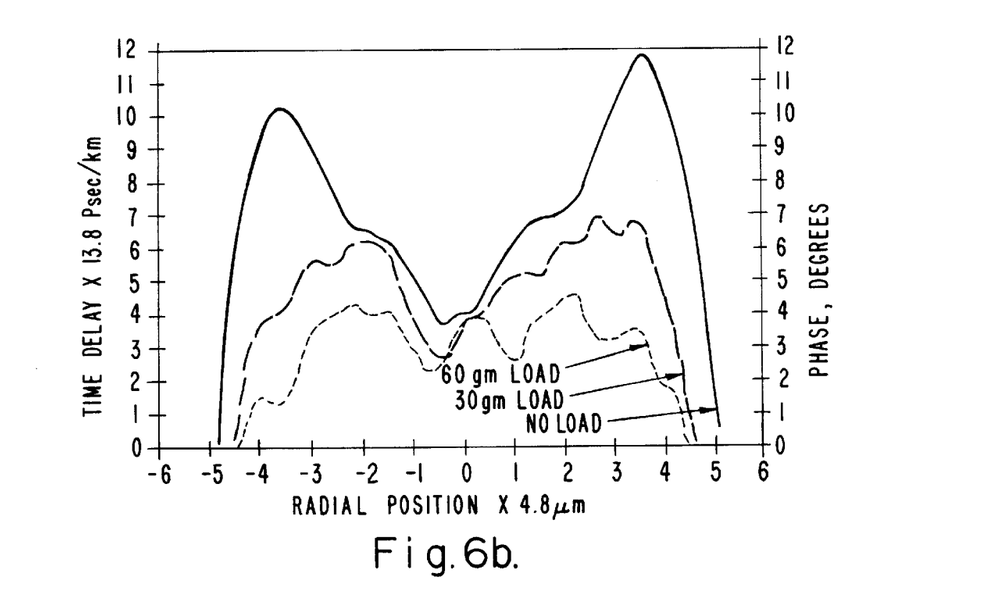

FIGS. 6a and 6b show the modal attenuation and delay profiles, respectively, of test fiber 86 with and without periodic macrobend perturbation. A macrobend with a 4 mm period was used. As can be seen from FIG. 6a, the three modal attenuation profiles corresponding to no load, 30 gm load and 60 gm load exhibit a rapid attenuation of high order mode power. From FIG. 6b it can be seen that there is a flattening of the modal delay profile with perturbation, the flattening becoming more pronounced as the perturbation is increased. The flattening effect is the result of mode-mixing whereby part of the optical power carried by one mode is transferred to another mode without any change of frequency. Notice also the narrowing of the profiles of FIG. 6b with increasing load. This narrowing is the result of mode-conversion whereby lower order modes are converted to higher order modes. Mode conversion resulting from perturbation causes displacement of the radial position at which rapid phase shifts occur.

Figure 6C:
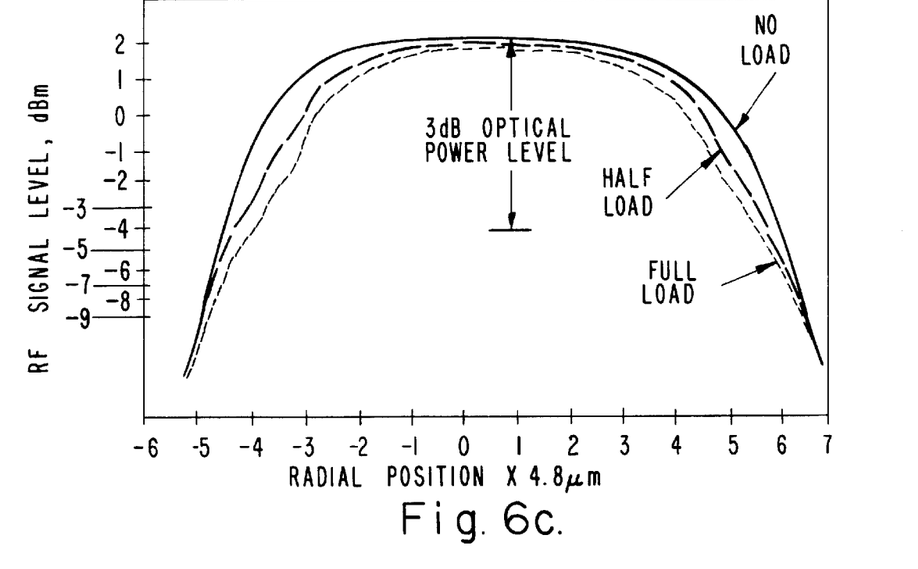
Figure 6D:
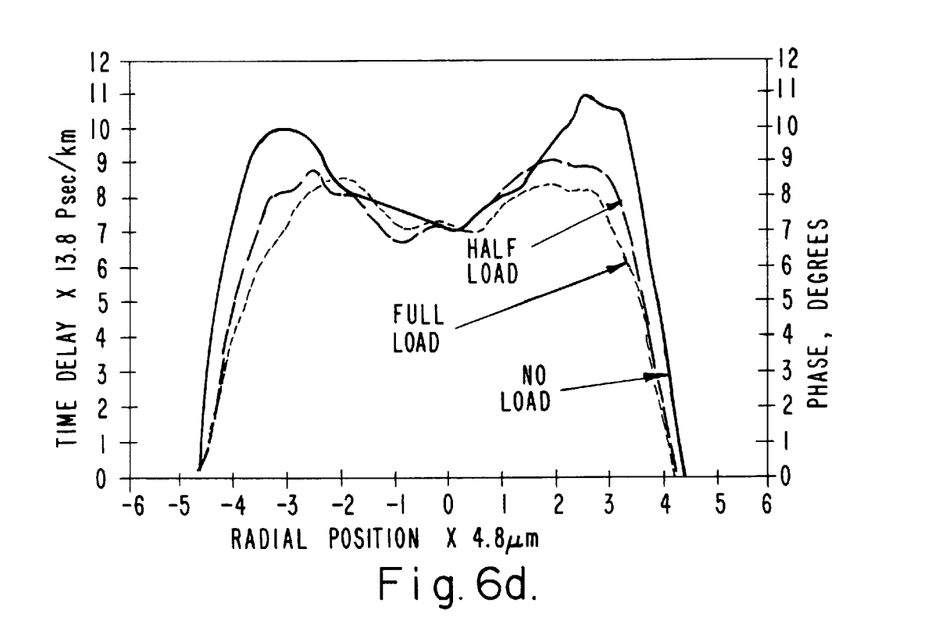
Figure 7A:
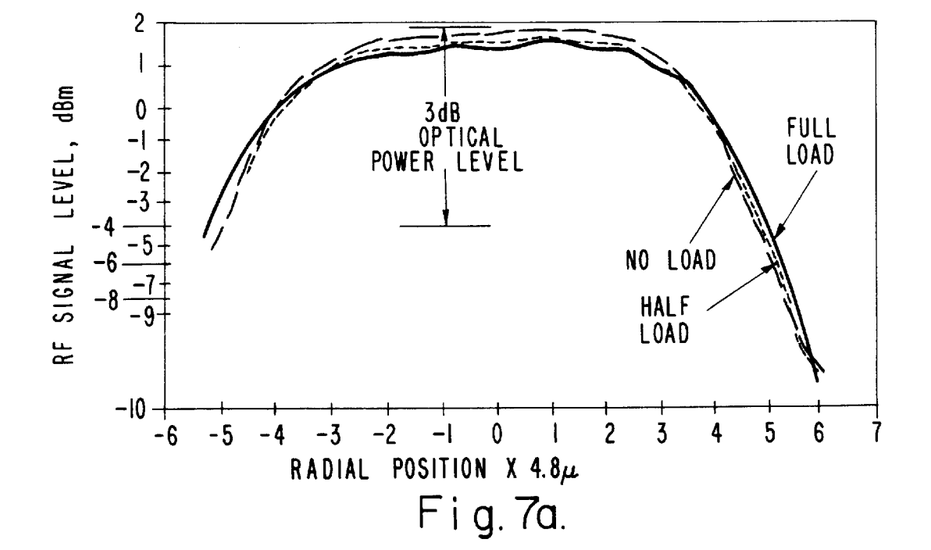
FIGS. 7a and 7c shown modal attenuation profiles and FIGS. 7b and 7d show modal delay profiles for the same fiber when subjected to periodic microbend perturbations.
Figure 7B:
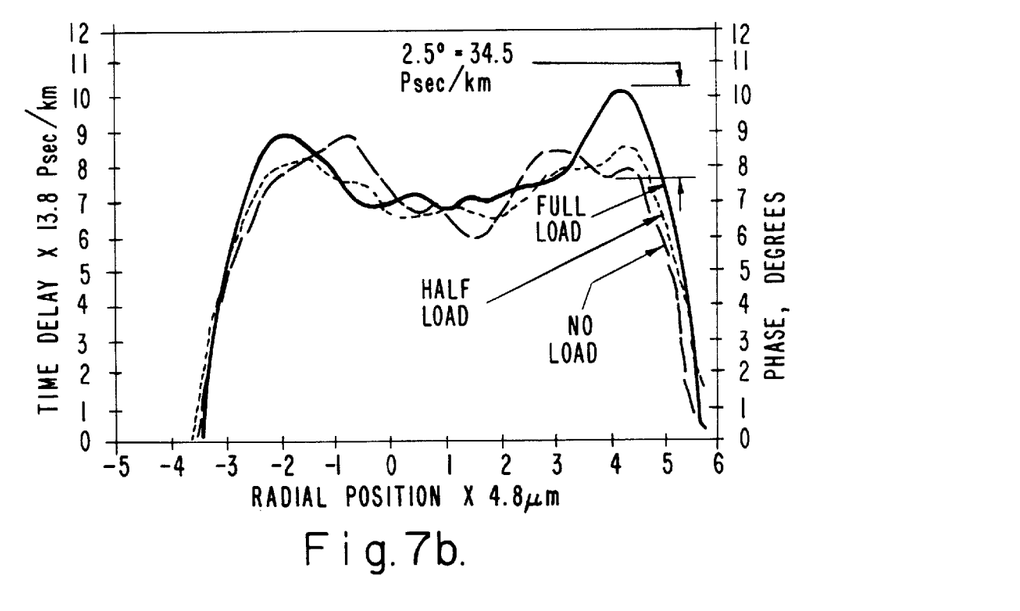
Figure 7C:
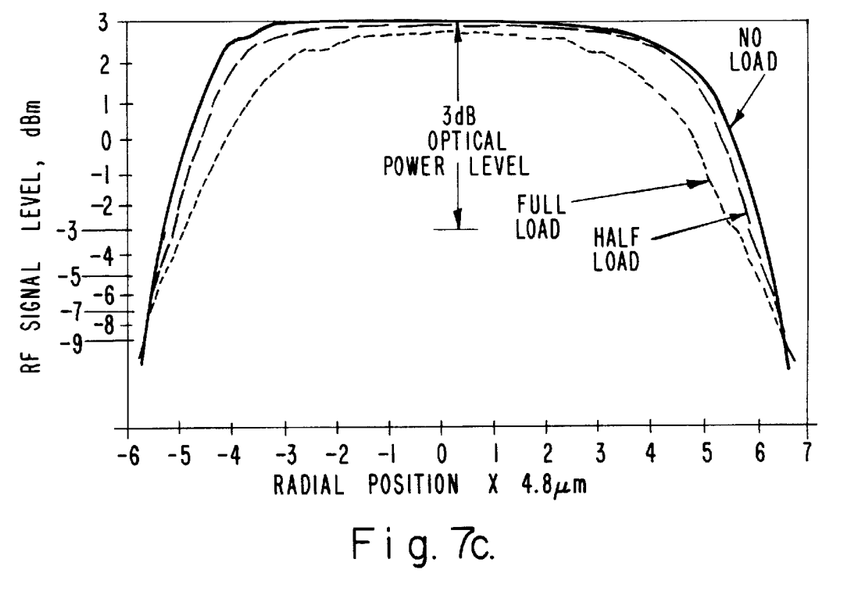
Figure 7D:
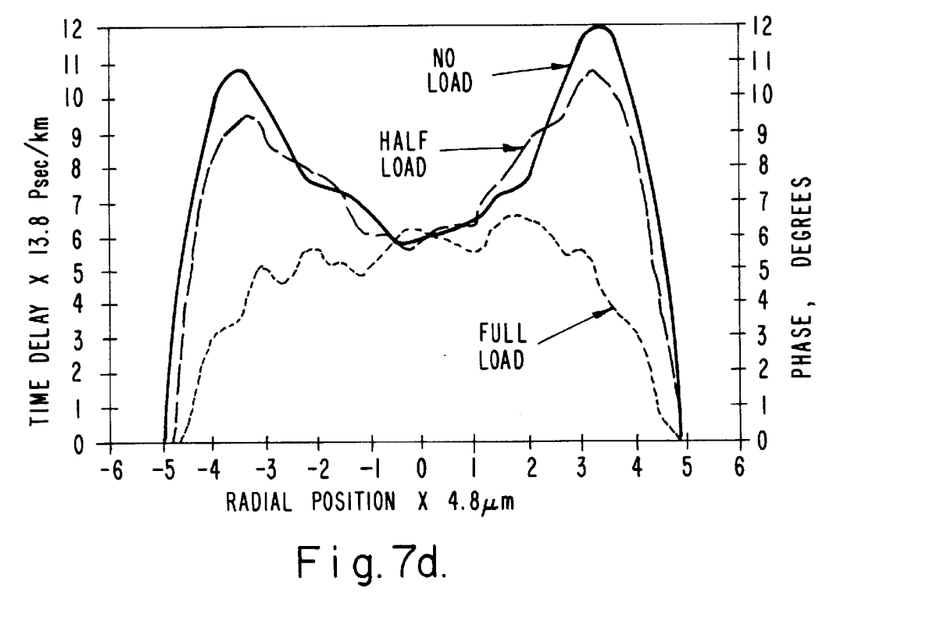

FIGS. 6c and 6d show the modal attenuation and delay profiles, respectively, of fiber 86 corresponding to no load, half load and full load periodic macrobend perturbations. Remarks made earlier with reference to FIGS. 6a and 6b are equally applicable to FIGS. 6c and 6d.

FIGS. 7a, 7c and 7b, 7d shown the modal attenuation and delay profiles, respectively, of test fiber 86 with and without periodic microbend perturbations. A microbend with a 2 mm period was used. Problems caused by hysteresis in the mechanical system were encountered. Remarks made earlier about the modal attenuation and delay profiles in connection with small loop and macrobend perturbations are also applicable to FIGS. 7a, 7b, 7c and 7d. Notice particularly that for all the perturbations studied, the modal delay profiles are more sensitive to perturbations than modal attenuation changes.

The experimental results obtained and presented in FIGS. 5–7, by showing the sensitivity of modal delay profiles to perturbations, clearly illustrate the advantages of using phase monitoring singly or in combination with power monitoring to detect intrusion into secure fiber optic communication links. The test results obtained using 400 MHz as the signal frequency and 480 meters of the Corning fiber indicate that the phase shift measure is sensitive to 0.2 degrees, and is limited by frequency instability of the RF source which in the test case was $1\times10^{-6}$ to $1\times10^{-5}$. The test fiber characteristics and signal frequency used correspond to a phase shift of 144 degrees/km for a 1 nanosecond time delay between modes. The present invention is equally applicable to other graded index multi-mode and single-mode fibers.

A unique fiber, for use in the present inventive system, having a profile which is optimal not only for transmission purposes, but also for intrusion detection is herein below described.

Figure 8A:
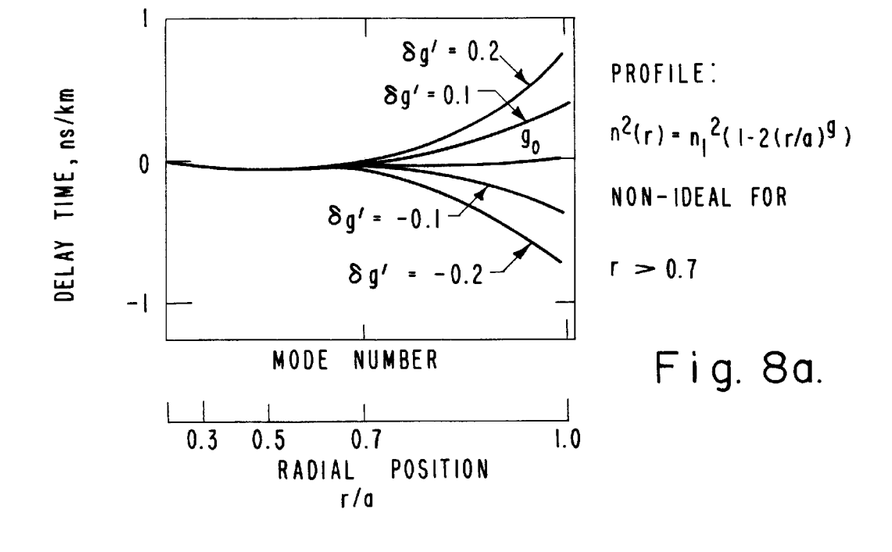
FIGS. 8a and 8b illustrate index of refraction profiles for near-optimum values showing the modal delay time variations for the different profiles.
Figure 8B:
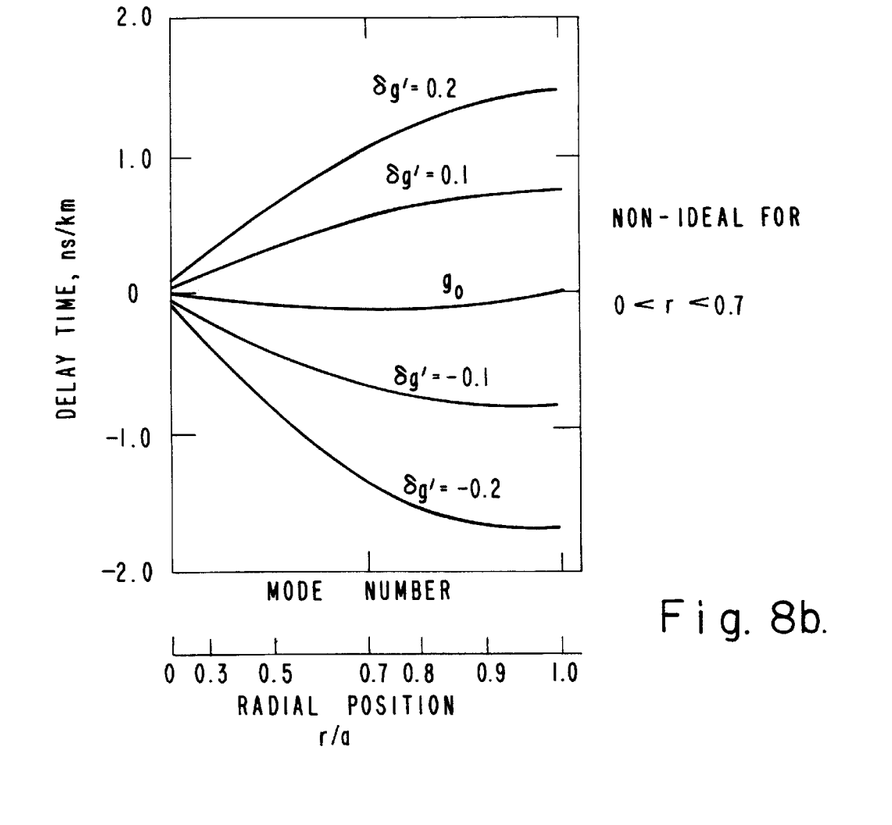

The transmitted mode groups, which are excited as shown in FIG. 1, have a definite phase relationship to the phase of the input beam. This relationship is fixed for an unperturbed fiber, and is determined by the index of refraction profile, frequency of modulation, degree of mode mixing and fiber length. Each mode is identified by a corresponding mode number. The mode number depends upon the position of entry point 8 or the radial coordinate "r". In the fiber optics art, the relationship between the modal phase and the mode number, or the modal phase delay and the mode number is typically used to optimize fiber index profiles to achieve maximum bandwidth. An input beam, transmitted by an ideal fiber with a large bandwidth, typically exhibits very little phase change for different mode numbers. For example, in FIGS. 8a and 8b, index of refraction profiles for near-optimum designs corresponding to g≅2 are illustrated to depict the variation of delay time with corresponding mode number. The x axis coordinates in FIGS. 8a and 8b are mode number, or alternatively, radial position. The radial position is given by r/a, where "r" is the radial coordinate defined earlier, and "a" is the core radius. Modes corresponding to r<0.7 are herein referred to as lower order modes and modes corresponding to r≧0.7 are referred to as higher order modes. In FIG. 8(a), the ideal profile corresponds to $g_o$. For $g_o$, there is practically no variation in the delay time with respect to mode number. However, for refractive index profiles varying slightly from the ideal profile $g_o$ by δg', there are variations in relative delays for the higher order modes. Although the deviations from the ideal are not very large, they are measurable and provide a basis for the present invention, as will be explained hereinbelow. Similarly, in FIG. 8(b), for profiles varying slightly from the ideal $g_o$ by δg', there are variations in delay times for the lower order modes corresponding to o<r<0.7.

As can be seen from FIGS. 8a and 8b, a very small variation (δg') from the ideal profile leads to measurable variations in the delays for higher order modes (FIG. 8a) and lower order modes (FIG. 8b), respectively. The fiber optic industry has typically considered such variation in modal delays to be a problem, and has generally sought to develop graded index fibers with an ideal profile. A conventional ideal fiber used for transmission has a profile which is adjusted to equalize or nullify variations in differential modal delays. Therefore variation in differential modal delays caused by intrusion into the fiber will be equalized so as to avoid measurable variations. Commercial fibers typically exhibit very high bandwidths when limited mode launching as in FIG. 1 is used, although the profiles may deviate significantly from the ideal over the full core. Also, in good quality commercial fibers, even though there may be deviations from the ideal profile, mode-mixing in the absence of perturbation is generally low because of profile uniformity along the length.

Perturbation of a fiber results in the following effects:
1. loss of guided mode power to cladding modes or leaky modes;
2. mode-mixing or mode-conversion or coupling between modes, that is, exchange of optical power between the different modes;
3. fiber bandwidth changes; and
4. modal delay changes or differential modal phase or time delays.

In the present invention, the above-discussed characteristics of commercial fibers which have been hitherto considered to be optimal for fiber optic transmission purposes are utilized in combination with the modal delay variation characteristic hitherto considered to be a problem to be avoided, to develop an optimal fiber profile. The present inventive profile is optimized both for fiber optic transmission (for example, low loss; low mode-mixing in the absence of perturbation, and high bandwidth) and for intrusion detection (for example, large, measurable, differential phase delays when mode coupling due to intrusion occurs; and enhancement of the susceptibility to perturbation of higher order modes relative to lower order modes).

Figure 9A:
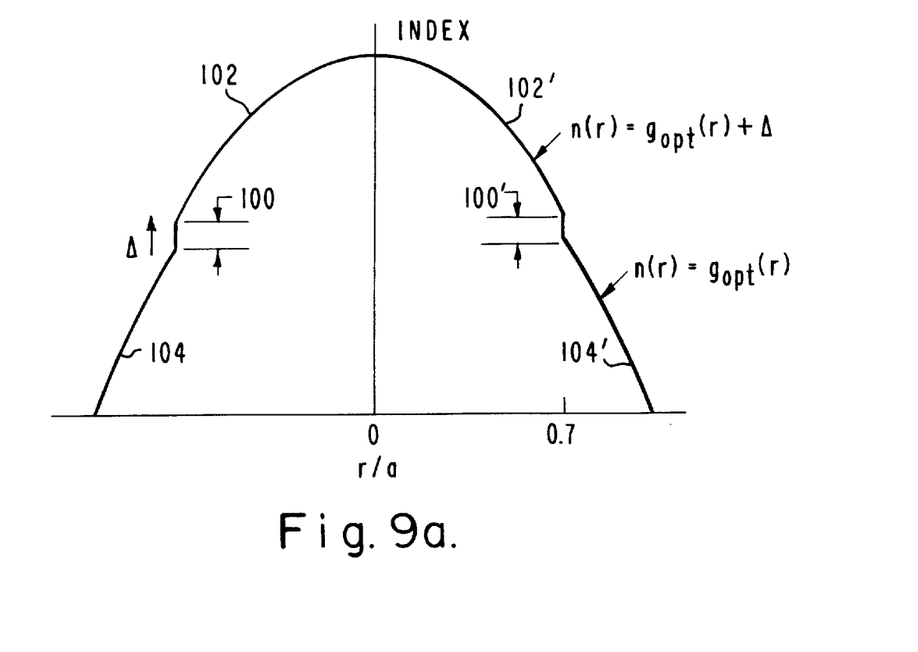
FIG. 9a illustrates an optimum fiber profile for use in the present inventive system.

A preferred optimum profile for a fiber for use in an intrusion detection/transmission system is illustrated in FIG. 9a. A small step index 100, 100' is formed within the core of an optimally graded index fiber. Such a profile generates three distinct modal groups which can be categorized in terms of the associated modal delays as follows:

(a) inner core or lower order modes which propagate in the graded index regions 102 and 102';
(b) intermediate core modes which propagate in the step index regions 100 and 100'; and
(c) outer core or higher order modes which propagate in the graded index regions 104, 104'.

Figure 9B:
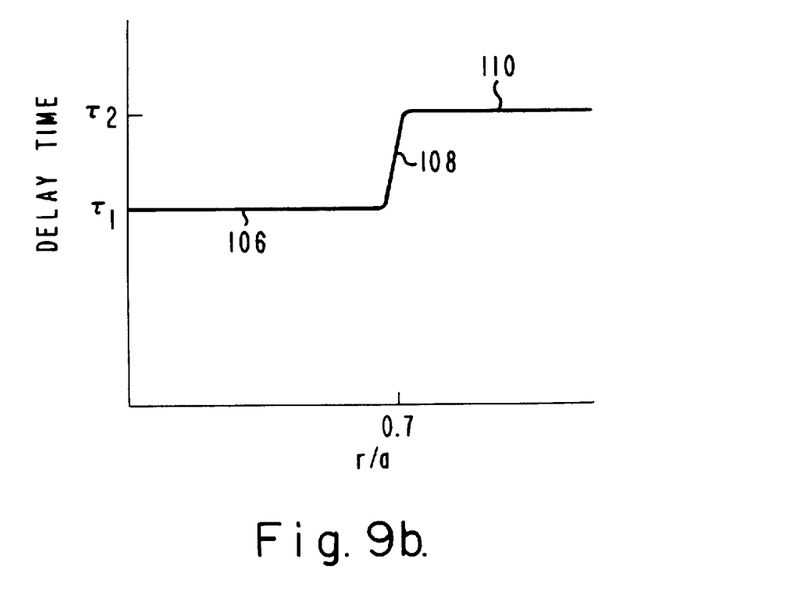

The inner and outer mode groups, (a) and (c), are thus separated by a fixed delay for a given length. The modal delay curve for a profile such as that shown in FIG. 9a is shown in FIG. 9b. An intrusion into a fiber of this type will cause mode conversion which will result in measurable modal phase (time) delay shifts. As can be seen from FIG. 9b there is a measurable difference in delay time ($T_2-T_1$) in the step index region 108, between the higher order modes (corresponding to region 110) and the lower order modes (corresponding to region 106). Intrusion will cause a variation in modal phase (time) delay which is more noticeable and measurable than would be the case with a conventional graded index fiber. Introduction of the intermediate step index region creates differentiation between the lower and higher order modes and enhances the modal phase delay response to intrusion. The intermediate step regions 100, 100') should not be made so large that mode-mixing or mode conversion becomes difficult. For example, for a core radius, a, in the range of 50 μm to 62.5 μm, the step index can be in the range of 0.0005 to 0.0015, and preferably about 0.001. This example is for illustrative purposes only and should not be treated as a limitation.

A fiber with the present inventive index profile can be drawn with conventional techniques such as the vapor-phase axial deposition technique such as that discussed in U.S. Pat. No. 4,260,221, for "Multimode Fiber With Z-Dependent Index Profile", issued Apr. 7, 1981, inventor, D. Marcuse.

Thus, there has been described a system for and method of detecting intrusions into secure fiber optic communication links. The alarm for signalling the presence of the detected intrusion is not limited to any particular configuration and is contemplated as being used in conjunction with the detection system. For example, the alarm can be a bell, flashing light, an arrangement which provides for automatic shut-down of data transmission or other suitable arrangements.

A unique feature of the present invention is its applicability not only to point-to-point data link designs but also to local area networks. For example, for a local area network with a simple ring configuration, the microwave modulated guard beam can be launched and detected at the same point in the ring. The organization of the ring network and network communication will not be affected by the presence of the guard beam. New terminals can be added to the network without affecting the intrusion detection system, since these terminals would merely extend the circumference of ring network.

Another useful capability of the present invention is its applicability to both graded index multi-mode and single-mode operation. For single-mode fiber operation, the guard beam is operated at a wavelength different from the data transmission wavelength, so that at the wavelength of the guard beam the fiber functions as a multi-mode fiber. For example, if the fiber is designed for single mode, high data rate transmission at 1·3 μm, the guard beam is operated at a wavelength, say 1·2 μm or 0·85 μm, for which the fiber supports multi-mode propagation.

It should be understood that the just described embodiments merely illustrate principles of the invention in preferred forms. Many modifications, deletions and additions may, of course, be made thereto without departure from the spirit and scope of the invention.

What is claimed is:
1. A system for detecting intrusions into a fiber optic communication system comprising:
(a) an optical fiber having a cladding and a primary core having an index profile with at least first, second and third graded index regions with intermediate first and second step index regions interposed between first and second, and second and third graded index regions, respectively, said index profile being uniform along the length of said fiber, said index profile for enhancing modal delay variation;

(b) first means optically coupled to one end of said fiber to launch a guard signal modulated optical beam in an entry point of said fiber for transmission by said fiber, said guard beam being capable of experiencing fluctuation in the magnitudes of modal delay and power attenuation responsively to intrusion into said fiber; and (c) second means optically coupled to the other end of said fiber for detecting the fluctuations in the magnitudes of the differential modal delay and power attenuation of said guard beam.

2. The system of claim 1 wherein said first means further includes means for varying said entry point of said optical beam into said fiber.

3. The system of claim 1 wherein said second means further includes an alarm for signalling detected intrusions.

4. The system of claim 1, wherein said fiber is the communication link of a point-to-point communication system.

5. The system of claim 1 wherein said fiber is the communication link of a local area network communication system.

6. The system of claim 5 wherein said local area network has a ring configuration and said second means is located at the same location as said first means.

7. An intrusion detection system for a fiber optic communication system comprising:

(a) an optical fiber having a cladding and a primary core having an index profile with at least first, second and third graded index regions with intermediate first and second step index regions interposed between first and second, and second and third graded index regions, respectively, said index profile being uniform along the length of said fiber, said index profile for enhancing modal delay variation;

(b) first means optically connected to one end of said fiber to launch a guard signal modulated optical beam into an entry point of said fiber; and (c) second means optically coupled to the other end of said fiber to monitor the modal delays of said guard beam.

8. The system of claim 7 wherein said first means further includes means for varying said entry point of said optical beam into said fiber.

9. The system of claim 7 wherein said second means further includes an alarm for signalling detected intrusions.

10. An intrusion detection system for a fiber optic communications system comprising:

(a) an optical fiber operating as a single mode fiber at the data transmission wavelength;

(b) first means optically coupled to one end of said fiber to launch a guard signal modulated optical beam into an entry point of said fiber, said guard beam having a wavelength such that said fiber acts as a multi-mode fiber at said guard beam wavelength; and (c) second means optically coupled to the other end of said fiber to monitor the modal delays of said guard beam.

11. The intrusion detection system of claim 10 wherein said second means monitors said modal delays in combination with power attenuation of said guard beam.

12. A method of detecting intrusion into a fiber optic communication system comprising the steps of:

(a) transmitting a guard signal modulated optical beam through a primary core of an optical fiber, said primary core having an index profile with at least first, second and third graded index regions with intermediate step index regions interposed between first and second, and second and third graded index regions, respectively;

(b) monitoring the differential modal phase delays of said guard signal modulated optical beam; and (c) detecting changes in the differential modal phase delays to detect the presence of said intrusion.

13. The method of claim 12 including the step of signalling the presence of said detected intrusion.

14. The method of claim 13 including the further step of signalling the presence of said detected intrusion.

15. A method of selecting optical fibers, suitable for use in a secure optical communication system, from a plurality of optical fibers suitable for optical communication, comprising the steps of:

(a) launching a guard signal modulated optical beam into an entry point of each one of said plurality of optical fibers;

(b) measuring a first modal delay profile of each one of said plurality of optical fibers without perturbation;

(c) perturbing each one of said plurality of optical fibers by applying perturbation of the same minimal magnitude;

(d) measuring a second modal delay profile of each one of said plurality of optical fibers when subjected to said perturbation; and (e) comparing the first and second modal delay profile of each one of said plurality of optical fibers so as to ascertain the extent of fluctuation in modal phase delay magnitude with said minimal perturbation; and (f) selecting optical fibers exhibiting sufficient fluctuation in modal phase delay magnitude for purposes of intrusion detection.

16. An apparatus for testing fibers to determine their suitability for use in intrusion detection systems for secure optical communications comprising:

(a) said fiber;

(b) first means optically coupled to one end of said fiber to launch a guard signal modulated optical beam into an entry point of said fiber;

(c) second means optically coupled to the other end of said fiber to determine the modal delay profile of said fiber; and (d) third means connected to said fiber at some intermediate point between said one end and said other end for perturbing said fiber.

17. An optical fiber for secure transmission of an optical beam therethrough and for enhanced sensitivity to intrusion, comprising:

a cladding, and a primary core having a cross-sectional index profile, said index profile having at least first, second and third regions having a graded index, a first step index region interposed between said first and second regions, and a second step index region interposed between said second and third regions, said index profile being uniform along the length of said fiber, said index profile for enhancing modal phase delay variation in said beam responsively to said intrusion.

* * * * *